US007980570B2

(12) United States Patent
Comunello

(10) Patent No.: US 7,980,570 B2
(45) Date of Patent: Jul. 19, 2011

(54) TROLLEY FOR A SLIDABLE CANTILEVER GATE AND PROCESS FOR ITS MANUFACTURE

(75) Inventor: Franco Comunello, Rosà (IT)

(73) Assignee: Fratelli Comunello S.p.A., Rosa (Vicenza) (IT)

(*) Notice: Subject to any disclaimer, the term of this patent is extended or adjusted under 35 U.S.C. 154(b) by 253 days.

(21) Appl. No.: 12/454,716

(22) Filed: May 21, 2009

(65) Prior Publication Data

US 2009/0309324 A1 Dec. 17, 2009

(30) Foreign Application Priority Data

Jun. 12, 2008 (EP) .................................... 08425418

(51) Int. Cl.
*B62B 1/00* (2006.01)

(52) U.S. Cl. ..................... 280/79.4; 280/79.6; 280/79.7; 280/79.11; 280/79.3

(58) Field of Classification Search ................. 280/79.3, 280/79.4, 79.6, 79.7
See application file for complete search history.

(56) References Cited

U.S. PATENT DOCUMENTS

| | | | | |
|---|---|---|---|---|
| 4,573,337 | A * | 3/1986 | Papesh | 72/305 |
| 4,674,726 | A * | 6/1987 | Roux | 254/7 R |
| 5,927,731 | A * | 7/1999 | Clarke | 280/79.7 |
| 6,598,916 | B2 * | 7/2003 | Miyazawa | 294/81.21 |
| 7,014,198 | B2 * | 3/2006 | Everitt et al. | 280/47.34 |
| 7,282,146 | B2 * | 10/2007 | Mannheim et al. | 210/236 |
| 7,300,063 | B1 * | 11/2007 | Prizmich | 280/79.4 |
| 7,413,394 | B2 * | 8/2008 | Risser | 414/542 |
| 7,478,984 | B2 * | 1/2009 | Hofius | 410/27 |
| 7,871,046 | B2 * | 1/2011 | Munro et al. | 248/129 |

FOREIGN PATENT DOCUMENTS

| | | |
|---|---|---|
| DE | 299 15 745 | 2/2001 |
| EP | 1 770 235 | 4/2007 |

OTHER PUBLICATIONS

European Search Report in EP 084 25 418, dated Nov. 6, 2008, 1 page.

* cited by examiner

*Primary Examiner* — Toan C To
(74) *Attorney, Agent, or Firm* — Collard & Roe, P.C.

(57) ABSTRACT

Trolley for a slidable cantilever gate comprising two L-shaped plates, each provided with a load-bearing wall and a base wall which is extended without interruption from the load-bearing wall by means of a substantially orthogonal fold. The load-bearing walls are rigidly connected by means of screws or rivets with the two base walls oriented in opposite directions so as to form a support base on ground. Each load-bearing wall is provided with two first through openings aligned with respective corresponding first openings of the other load-bearing wall so to jointly define two first seats adapted to house first rotatable support means for two pairs of support wheels; and with a second through opening aligned with that corresponding on the other load-bearing wall so to jointly define a second seat for receiving a guide wheel, rotatably supported by second rotatably support means. The load-bearing walls, moreover, are each provided with a first shape with concavity facing that of the other load-bearing wall in order to jointly define a first housing adapted to receive a fixing screw of the pin of the guide wheel, and a second shape with concavity facing that of the other load-bearing wall in order to jointly define a second housing, which communicates with a vertical guide defined in one of the first seats, and houses adjustment means operating on a slide which bears, pivoted, a pair of adjustable wheels, in order to adjust its vertical height.

10 Claims, 5 Drawing Sheets

TROLLEY FOR A SLIDABLE CANTILEVER GATE AND PROCESS FOR ITS MANUFACTURE

FIELD OF APPLICATION

The present invention concerns a trolley for a slidable cantilever gate and a process for its manufacture according to the preamble of the respective independent claims.

The invention falls within the sector of the production of accessories for gates, that is gates intended to control the carriageable or pedestrian access passage to a property, construction site, company, building or garden.

The trolley of the invention is advantageously intended to be installed on slidable cantilever gates, even those of considerable size, especially for access to industrial buildings, or of smaller size for residential applications.

STATE OF THE ART

The slidable cantilever gates, of known type, traditionally comprise a support framework having a lower crossbar with a longitudinal rail fixed on its lower part, such rail substantially extending for the entire length of the gate.

Below the rail, two trolleys are provided, whose load-bearing structure is rigidly anchored to the ground in spaced positions, aligned in the sliding direction of the gate.

On the load-bearing structure of each trolley, a plurality of idle wheels are mounted which rotate inside the rail placed below the gate, in order to guide the latter during its opening and closing movement.

Traditionally, the movement is of automatic type, obtained by means of a motor housed in a column placed alongside the gate, and connected by means of transmission to a vertical-axis pinion which is engaged in a rack fixed on one flank of the gate framework.

More in detail, each trolley is provided with two support wheel pairs, with substantially horizontal rotation axis, on which the weight of the gate rests, and at least one guide wheel with substantially vertical rotation axis, which is interposed between the two support wheel pairs.

The guide wheels of the two trolleys cooperate with each other in order to avoid transverse swerves of the gate during its movement.

At least one pair of support wheels of each gate can be regulated and its vertical position can be adjusted in order to vary the height of the gate once the latter is placed entirely projecting in a cantilever manner. For such purpose, adjustment means are provided which move the rotation pin of the aforesaid pair of adjustable support wheels. Currently, as is known, the support structures of the trolleys are made with a high number of components and in particular with several plates which must be integrally fixed together by means of laborious welding operations.

This negatively affects the production process, which results lengthy and costly. In addition, the support structure obtained with this process by means of assembly of many components is not particularly mechanically strong.

The industrial processes of known type for the production of trolleys often resort also to finishing steps for making threads in which fixing and/or adjusting screws are engaged. These operations are also rather difficult to achieve and negatively affect the speed of the production cycle.

The quality of the gate functioning is strongly influenced by the manufacturing precision of the trolleys, since even minimal deviation from the foundations or defects in the load-bearing body can lead to a malfunctioning of the gate or give rise to annoying noise.

The complex production modes currently employed in gate manufacture do not lead to a final precise and easy installation of the gates.

PRESENTATION OF THE INVENTION

In this situation, the problem underlying the present invention is therefore that of eliminating the drawbacks of the prior art up to today, providing a trolley for a slidable cantilever gate which is obtained with a limited number of components.

A further object of the present finding is that of providing a trolley for a slidable cantilever gate that is structurally simple, economical to make and entirely reliable.

Another object of the present finding is that of providing a trolley for a slidable cantilever gate which is particularly safe.

Another object of the present finding is that of providing a process for making a trolley for a slidable cantilever gate is quick, simple and economical to make.

BRIEF DESCRIPTION OF THE DRAWINGS

The technical characteristics of the finding, according to the aforesaid objects, are clearly seen in the contents of the below-reported claims; the advantages of the same are more evident from the following descriptions, given with reference to the attached drawings which represent a merely exemplifying and non-limiting embodiment thereof, wherein:

DETAILED DESCRIPTION OF A PREFERRED EMBODIMENT

Figure 1:
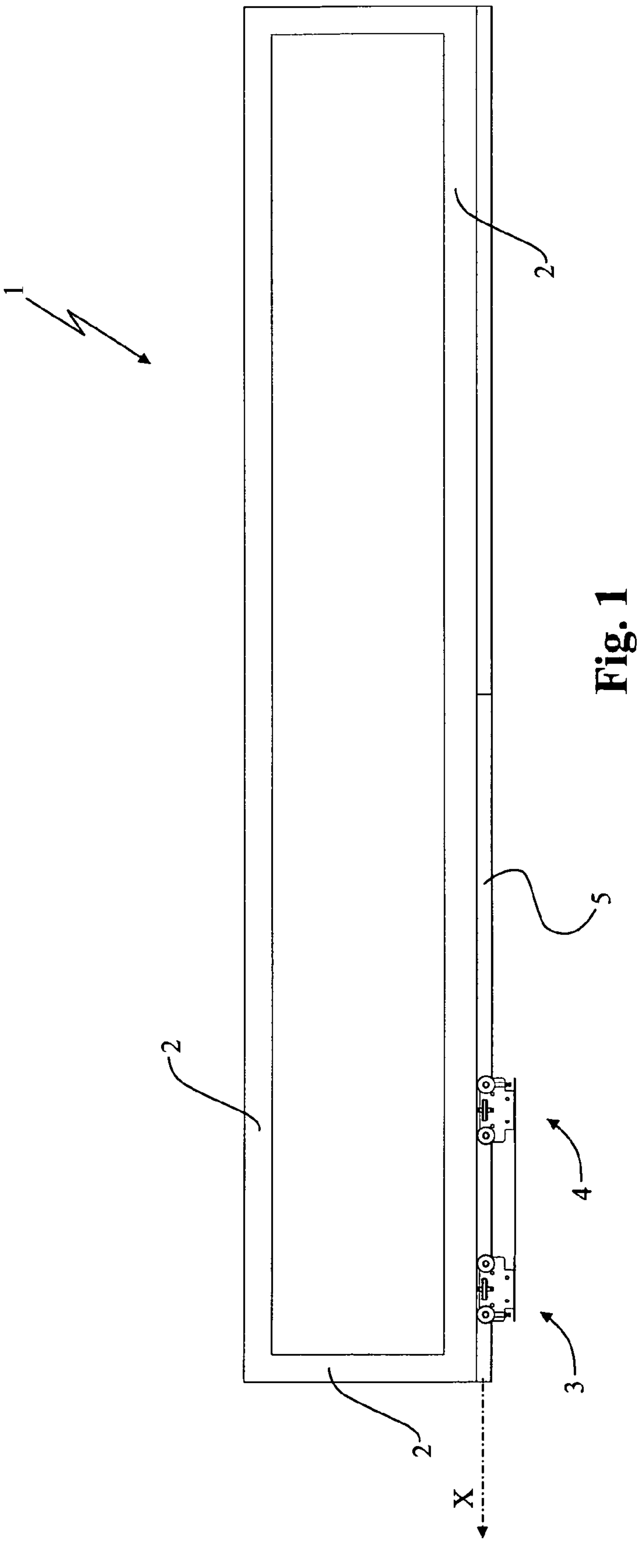
FIG. 1 shows an overall schematic view of the slidable cantilever gate with two trolleys mounted, object of the present invention.
Figure 2:
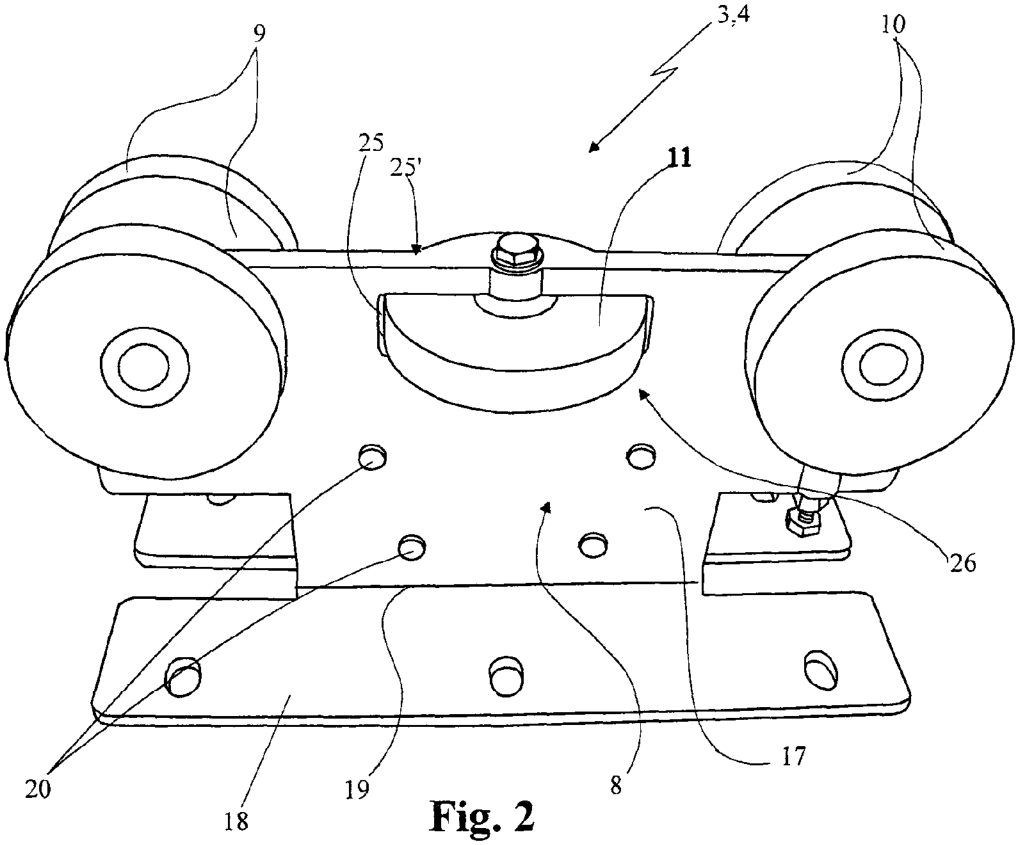
FIG. 2 shows a first (side) perspective view of the trolley for a slidable cantilever gate, object of the present invention.
Figure 3:
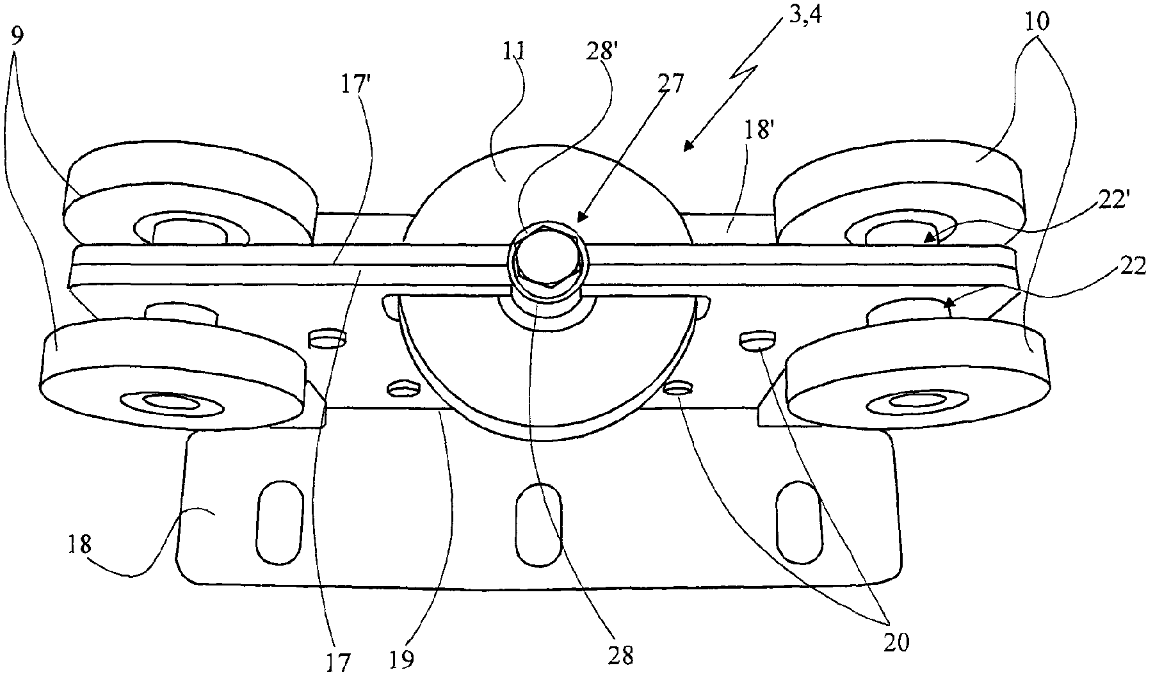
FIG. 3 shows a second (top) perspective view of the trolley for a slidable cantilever gate, object of the present invention.
Figure 4:
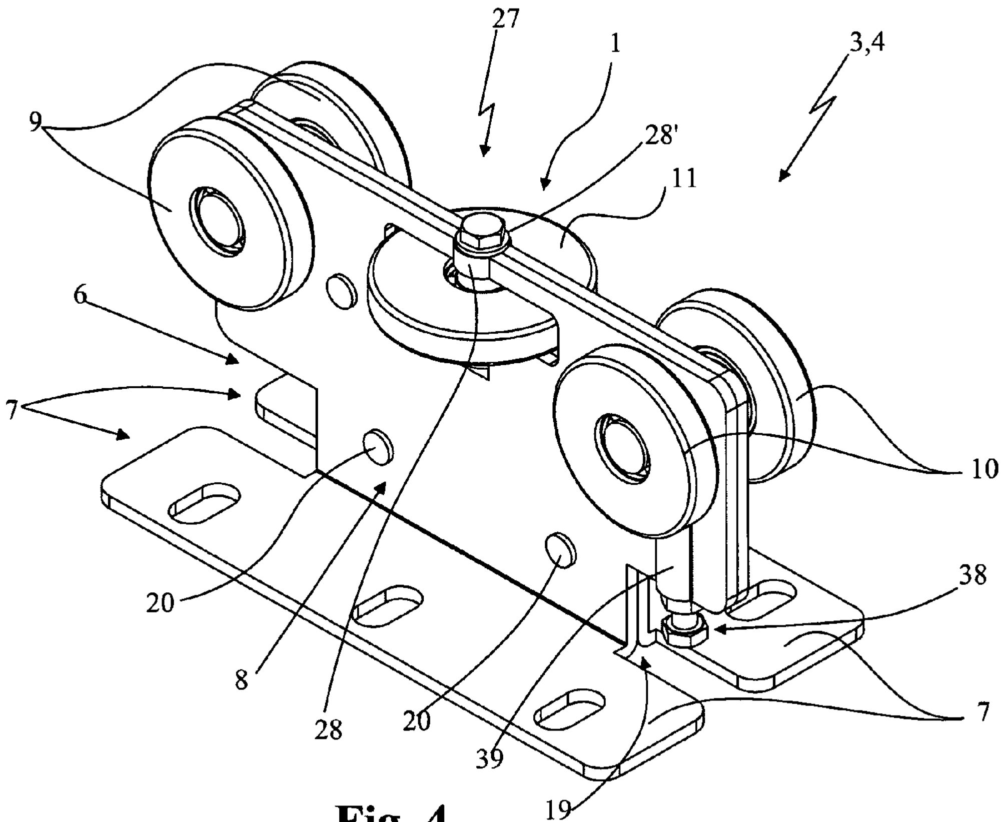
FIG. 4 shows a third perspective view of the trolley for a slidable cantilever gate, object of the present invention.
Figure 5:
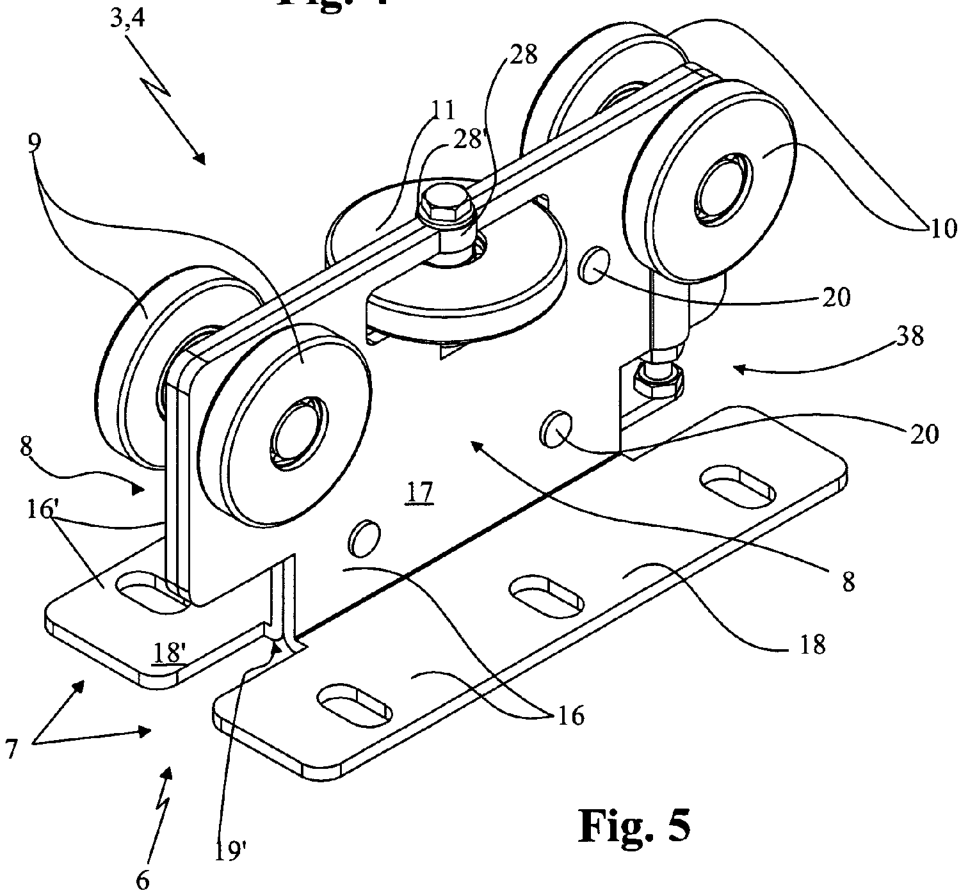
FIG. 5 shows a fourth perspective view of the trolley for a slidable cantilever gate, object of the present invention.
Figure 8:
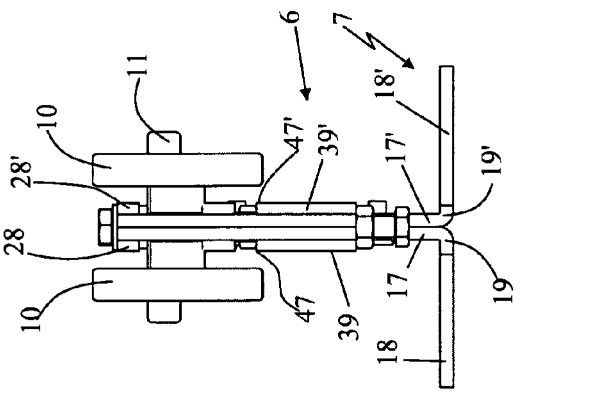
FIG. 8 shows the trolley for a slidable cantilever gate, object of the present invention, in a front axonometric view.
Figure 7:
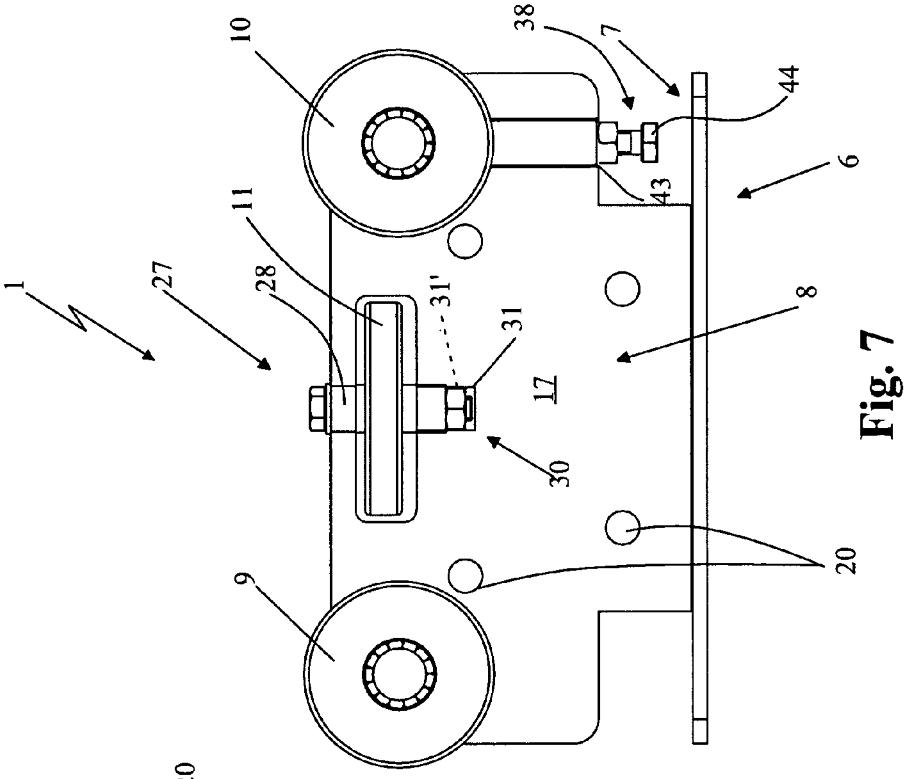
FIG. 7 shows the trolley for a slidable cantilever gate, object of the present invention, in a side axonometric view.
Figure 6:
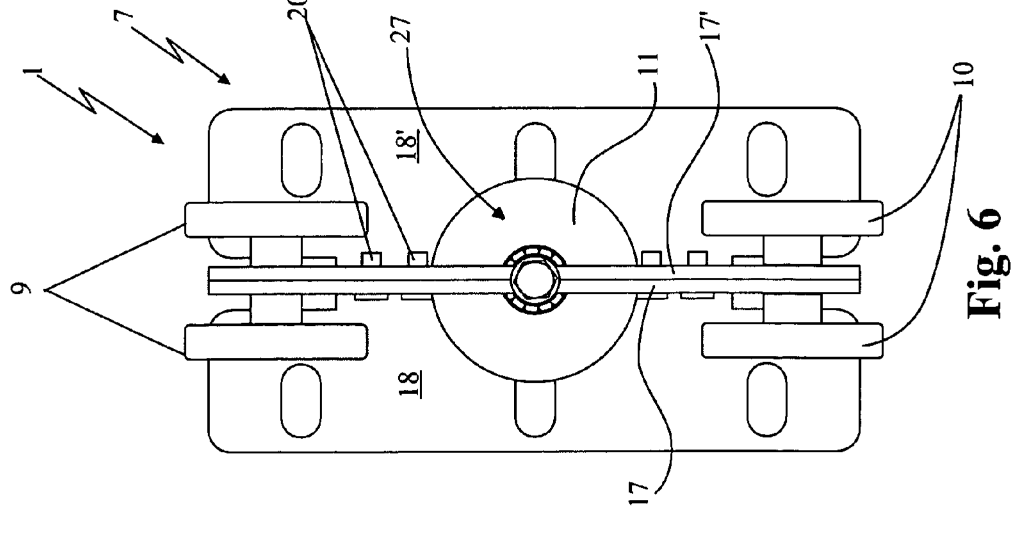
FIG. 6 shows the trolley for a slidable cantilever gate, object of the present invention, in a top axonometric view.

With reference to the drawing set, a slidable cantilever gate embodiment is indicated with 1 supporting two trolleys 3,4, object of the present invention, on its lower part.

With the term gate it will be intended, without departing from the protective scope of the present invention, any one obstruction, such as a main outside door or gate, susceptible for sliding between two opening and closing positions so as to carry out the traditional function of controlling a carriageable or pedestrian access passage to a property, construction site, company, building or garden.

In accordance with the attached figures, the gate 1 is provided with a support framework 2, generally made of steel, having a predominant extension along the advancing direction X of the gate 1. Such support framework 2 is formed by a metal frame, that is by a plurality of uprights and crossbars, and is usually closed by darkening cover panels or by gratings.

The gate 1 is slidably supported between the two closed and open positions along an advancing direction X by the two trolleys 3 and 4, which are spaced from each other and substantially aligned along the aforesaid advancing direction X.

Both trolleys 3, 4 are placed outside the dimensions of the access passage, and are placed at a distance such to permit supporting the gate 1 in a cantilever manner, by operating in a per se traditional manner: one trolley in traction and the other in abutment depending on whether the gate 1 is in open or closed position.

In order to support the mechanical stresses transmitted by the gate 1, each trolley 3, 4 is rigidly constrained to the ground by means of their own foundation.

Moving means are also traditionally provided (not illustrated) for moving the gate 1 along the advancing direction X, which usually comprise a rack fixed to the framework 2 of the gate 1 and a fixed motor placed in a pillar on the side of the gate, which engages with a pinion in the rack for transmitting the movement to the gate 1.

On the lower part of the gate 1, a rail 5 is fixed by means of welding or mechanical coupling and/or fixing screws. Such rail 5 is substantially extended for the entire length of the gate 1 and defines a lengthened hollow profile within which a plurality of idle wheels are slidably engaged, as will be discussed below. Such idle wheels are adapted to guide the gate 1 along the advancing direction X, that is between the open and closed positions.

More in detail, each trolley 3,4 comprises a support structure 6 formed by a support base 7, intended to be fixed to the foundations made in the ground, and by a load-bearing body 8, fixed to the support base 7, on which the weight of the gate 1 is unloaded.

The aforesaid load-bearing body of structure 6 of the trolley 3,4 has two pairs of support wheels 9, 10 rotatably mounted, (the support wheel pairs are preferably two in number but could also be one or three), which are free to rotate with substantially horizontal rotation axis within the rail 5, and a guide wheel 11, which is free to rotate with substantially vertical rotation axis within the rail 5.

Functionally, the two pairs of support wheels 9, 10, receive the weight of the gate 1 and have the task of rotating in the rail in order to make the gate 1 move, while the guide wheel 11 cooperates with the other trolley in order to oppose deviations of the same gate 1 transverse to its advancing direction X.

Figure 9:
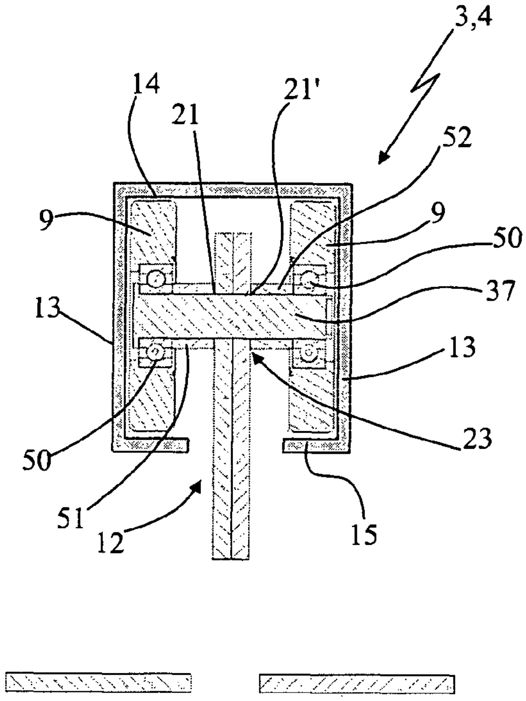
FIG. 9 shows the trolley for a slidable cantilever gate, object of the present invention, in a section view carried out along the trace IX-IX of FIG. 7, with a guide rail fixed to the lower part of the gate indicated with a dashed line.

For such purpose, as can be appreciated in FIG. 9, the hollow profile of the rail 5 (indicated with a dashed line) has a tubular shape, which is open on its lower part with a longitudinal slit 12, and is provided with opposite, lateral, substantially vertical walls 13, on which the guide wheel 11 rests and substantially horizontal upper 14 and lower 15 opposite walls, on which the two pairs of support wheels 9, 10 rest.

According to the idea underlying the present invention, the support structure 6 of each trolley 3,4 comprises two shaped plates 16, 16', each provided with a load-bearing wall 17, 17' and a base wall 18, 18' which is extended without interruption from the load-bearing wall 17, 17' by means of a substantially orthogonal fold 19, 19'.

The load-bearing walls 17, 17' of the two shaped plates 16, 16' are rigidly connected with each other by means of fixing means 20 and together form the load-bearing body 8 of each trolley 3, 4, while the two walls of base 18, 18' are oriented in opposite directions so to form the aforesaid support base 7 on the ground.

The aforesaid fixing means 20 advantageously consist of rivets, screws or bosses, it being possible to preferably prevent joining the two load-bearing walls 17, 17' by means of welding, in order to reduce the production process times.

More in detail, each load-bearing wall 17, 17' is provided with two first through openings 21, 22 aligned with respective corresponding first openings 21', 22' of the other load-bearing wall 17', 17 so as to jointly define two first seats 23, 230 adapted to house first rotatable support means 24 for supporting the two pairs of support wheels 9, 10.

Each load-bearing wall 17, 17' is also provided with a second through opening 25, 25' aligned with that corresponding to the other load-bearing wall 17', 17 in order to jointly define a second seat 26 for receiving the guide wheel 11, in turn rotatably supported by second rotatable support means 27.

Furthermore, the load-bearing walls 17, 17' of the two shaped plates 16, 16' are each provided with a first shape 28, 28' with concavity facing that of the other load-bearing wall 17', 17 in order to jointly define a first housing 29, which communicates with the second seat 26 and at least in part receives the second rotatable means 27 of the guide wheel 11. More in detail, the first housing 29 is composed of two vertically-aligned sections, which are interrupted by the second seat 26, from which they extend. One section extends upward until it reaches the upper profile of the load-bearing body 8, and the other downward until it terminates in a third seat 30 obtained with third through openings 31, 31' made aligned on the two load-bearing walls 17, 17'.

Each section of the first housing 29 is obtained with facing pairs of first shapes 28 preferably composed of semicylindrical convexity obtained by moulding.

Figure 10:
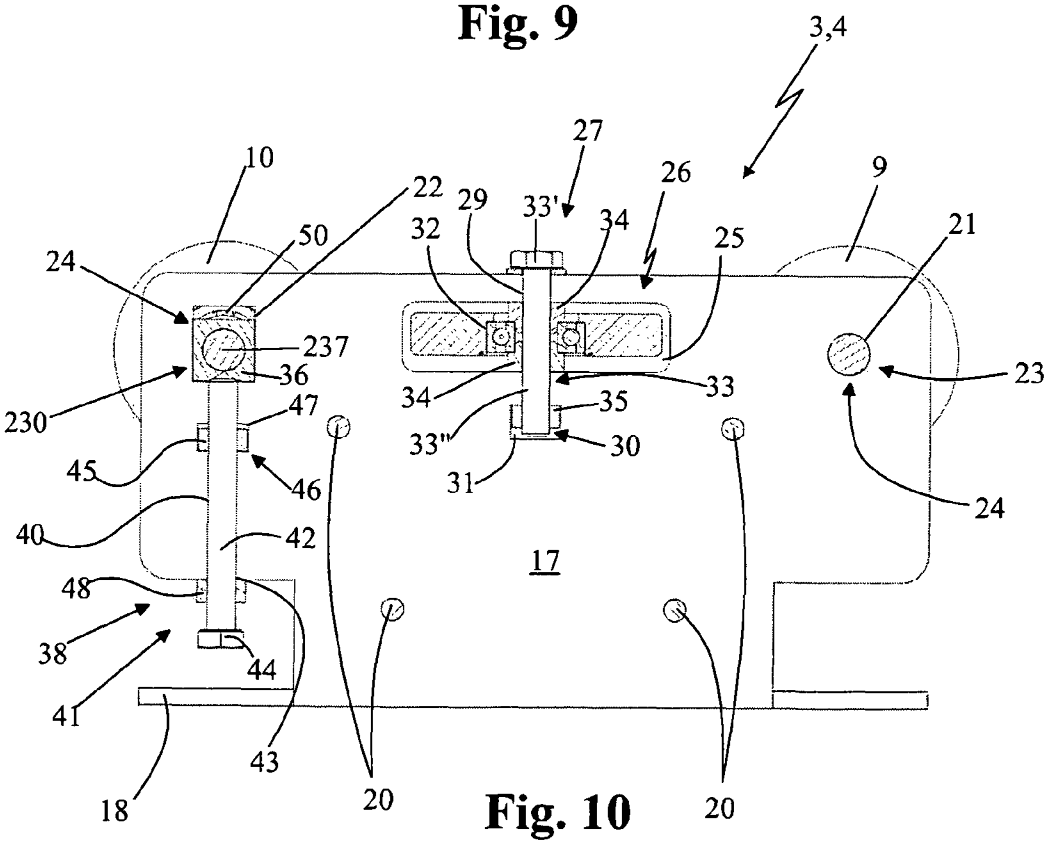
FIG. 10 shows the trolley for a slidable cantilever gate, object of the present invention, in a section view carried out along the trace X-X of FIG. 8.

As is visible in FIG. 10, the aforesaid second rotatable support means 27 comprise at least one pair of first spacers 34, centrally perforated and inserted within the second seat 26 so to support the inner ring of a bearing 32, on whose outer ring the aforesaid guide wheel 11 is mounted. The latter is retained in the second seat 26 by means of a retaining screw 33, which is provided with a head 33' which is abutted on the upper profile of the load-bearing body 8, and a shank 33" which is vertically inserted in the two sections of the first housing 29, perfectly passing within the central holes of the two first spacers 34 placed in the second seat 26, until it projects with the threaded end within the third seat 30 where it is locked by a locking nut 35 embedded within the same third seat 30.

Preferably, the width of the third seat 30 will be such to retain normal commercial-size nuts embedded, without being able to rotate.

The first means of rotatable support 24 which support the two pairs of support wheels 9, 10 comprise a central pin 37, 237 which is inserted within the seats 23, 230 and rotatably supports at the ends, by means of bearings 50, the two pairs of support wheels 9, 10.

Second and third spacers 51, 52 are interposed between the load-bearing walls 17, 17' and the bearings 50.

Advantageously, at least one (10) of the two pairs of support wheels 9,10 is height-adjustable in order to permit controlling elevation of the gate 1 when the latter is in 'all-out'closed position.

For such purpose, the corresponding first seat 230, intended to house the first rotatable support means 24 of the pair of adjustable support wheels 10, with rectangular openings defines a vertical guide for a slide 36 counter-shaped with respect to the guide and in form coupling therewith.

The slide 36 is preferably of parallelepiped form and supports the rotation pin 237 of the pair of adjustable support wheels 10, which is therefore not directly housed in the first seat 230 like the pin 37 of the other pair of support wheels 9.

Adjustment means 38 operate on such slide 36 so to move the corresponding pair of adjustable support wheels 10.

The load-bearing walls 17, 17' of the shaped plates 16, 16' are each provided with a second shape 39,39' with concavity facing that of the other load-bearing wall 17', 17 in order to jointly define a second housing 40, which communicates with the vertical guide 230 and houses the aforesaid adjusting means 38.

The latter means preferably comprises an adjusting screw 41, which is provided with a shank 42 inserted in the second housing 40 until it projects within the first seat 230 in order to abut against the slide 36. The load-bearing body 8 has a step recess 42 turned towards the support base 7, from which the second housing 40 is extended with one access edge 43, from which the head 44 projects of the adjusting screw 41, easily accessibly so as to be brought into rotation by a tool, such as a wrench.

The threaded shank 42 of the adjustment screw 41 is engaged in an intermediate position with a nut 45 embedded in a fourth seat 46 obtained with four through holes 47, 47' made aligned on the two load-bearing walls 17, 17'.

Operatively, the height position of the aforesaid pair of adjustable support wheels 10 is adjusted by operating with the wrench on the head 44 of the adjustment screw 41, so as to make it axially move, screwing it or unscrewing it with respect to the nut 45 embedded in the fourth seat 46. Thus, the slide 36 is moved which supports the pair of support wheels 10 adjustable in the guide 230 until the desired position is reached. The latter, once found, is maintained by fixing a lock nut 48 which operates on access edge 43 of the second housing 40.

The load-bearing body 8 is usually affected by greater mechanical forces than the base 7. Nevertheless, sizing the thickness of the entire shaped plate as a function of the mechanical strength required by the load-bearing body 8 could be too difficult. Therefore, in this case, it is preferable to interpose between the two load-bearing walls 17, 17' a reinforcing wall (not illustrated), substantially provided with an outer profile equivalent to that of the two load-bearing walls 17, 17' and internally provided with openings placed at the openings and shapes of the two load-bearing walls 17, 17', preferably in a manner so as to not modify their functionality.

Also forming the object of the present invention is a process for making a trolley 3,4 for a slidable cantilever gate 1, in particular of the type described above, so that the same reference numbers are used for the sake of simplicity.

According to the invention, the process comprises a cutting step of the profile of a metal, preferably steel plate, for example by means of shearing or laser cutting, for obtaining at least two shaped flat plates with the first openings 21,21', 22,22' and the second openings 25, 25' considered above made thereon.

A folding step is then provided of the shaped flat plates, aimed to define, by means of a substantially orthogonal fold 19, 19', two L-shaped plates 16,16' with the longer section adapted to form the load-bearing walls 17, 17' and the shorter section the base wall 18, 18'.

Once folded, the shaped plates 16, 16' are fixed to each other by means of a corresponding fixing step aimed to rigidly join the load-bearing walls 17, 17' with the two base walls 18, 18' oriented in opposite directions for forming the support base 7 to the ground.

At this point, it is possible to continue mounting the two pairs of support wheels 9, 10 and the guide wheel 11, respectively, by means of the respective first and second rotatable support means 24, 27 housed in the first seats 23, 230 and in the second seat 26.

In order to make the trolley 3,4 in accordance with the preferred embodiment of the present invention, that is with the first and the second rotatable support means 24, 27 obtained as described above, the process also comprises a moulding step, in which by means of a press, the concavities defining the first housing 29 along with the concavities defining the second housing 40 are made on the flat plates.

The finding thus conceived therefore achieves the predetermined objects.

Of course, in its practical achievement, it could also assume shapes and configurations different from that illustrated above, without departing from the present protective scope.

In addition, all details could be substituted with technically equivalent elements, and the sizes, shapes and materials employed could be of any type as needed.

The invention claimed is:

1. Trolley for a slidable cantilever gate provided with a support framework having a predominant extension along an advancing direction and bearing fixed, on its lower part and along said advancing direction, a hollow rail for the guide of said gate;

said gate comprising:

- a support structure provided with:
  - a support base, intended to be fixed to the ground and,
  - a load-bearing body, fixed to said base;
- at least one pair of support wheels, which are mounted on the load-bearing body of said support structure, and are free to rotate with substantially horizontal rotation axis within said rail for supporting the weight of said gate;
- and at least one guide wheel, which is mounted on the load-bearing body of said support structure and is free to rotate with substantially vertical rotation axis within said rail in order to oppose deviations of said gate transverse to its advancing direction;

characterised in that said support structure comprises two shaped plates, each provided with a load-bearing wall and a base wall which is extended without interruption from the load-bearing wall by means of a substantially orthogonal fold, the load-bearing walls of said shaped plate being:

- rigidly connected to each other by means of fixing means in order to form said load-bearing body, with the two base walls oriented in opposite directions so as to form said support base to the ground;
- each provided with:
  - two first openings aligned with respective corresponding first openings of the other load-bearing wall in order to jointly define two first seats adapted to house first rotatable support means of said at least one pair of support wheels;
  - a second through opening aligned with the corresponding opening of the other load-bearing wall in order to jointly defining a second seat for receiving said guide wheel, rotatably supported by second rotatable support means.

2. Trolley for a slidable cantilever gate according to claim 1, characterised in that the load-bearing walls of said shaped plates are each provided with a first shape with concavity facing that of the other load-bearing wall so to jointly defining a first housing, which at least in part receives the second rotatable support means of said guide wheel and communicates with said second opening.

3. Trolley for a slidable cantilever gate according to claim 2, characterised in that said first housing is extended in two vertically-aligned sections, obtained starting from opposite sides of said second opening by means of separate portions of said first shapes on the two load-bearing walls.

4. Trolley for a slidable cantilever gate according to claim 3, characterised in that said second rotatable support means comprise at least one retaining screw which is vertically inserted in said first housing, through said opening and is locked by a locking nut embedded within a third seat communicating with said first housing and obtained with third through openings aligned on the two load-bearing walls.

5. Trolley for a slidable cantilever gate according to claim 1, characterised in that at least one of said first seats defines a vertical guide for a slide bearing the first rotatable support means of a pair of adjustable wheels of said pairs of support wheels.

6. Trolley for a slidable cantilever gate according to claim 5, characterised in that the load-bearing walls of said shaped plates are each provided with a second shape with concavity facing that of the other load-bearing wall so as to jointly define a second housing, which communicates with said vertical guide and houses adjustment means operating on said slide for moving said corresponding pair of adjustable support wheels.

7. Trolley for a slidable cantilever gate according to claim 6, characterised in that said adjustment means comprise at least one adjustment screw, which is arranged within said second housing, projects inside said second opening with the end of the threaded shank so as to abut against said slide, and arranges a head which is accessible for being brought into rotation with a tool, a nut engaged with the threaded shank being housed in a fourth seat obtained with four through openings made aligned on the two load-bearing walls.

8. Trolley for a slidable cantilever gate according to claim 7, characterised in that said adjustment means comprise at least one lock nut for locking the screw in the desired adjustment position.

9. Trolley for a slidable cantilever gate according to claim 8, characterised in that said shaped plates have a step recess from which said second housing is extended with an access edge, from which said adjustment screw projects and on which said lock nut rests.

10. Trolley for a slidable cantilever gate according to claim 1, characterised in that said fixing means are composed of rivets, screws or bosses.

* * * * *